United States Patent [19]
Barritt

[11] Patent Number: 5,847,369
[45] Date of Patent: Dec. 8, 1998

[54] INDUCTION COOKING CARTRIDGE FOR USE WITH BI-METAL SWITCHES

[75] Inventor: William D. Barritt, Cleveland, Tenn.

[73] Assignee: Maytag Corporation, Newton, Iowa

[21] Appl. No.: 671,201

[22] Filed: Jun. 27, 1996

[51] Int. Cl.[6] .............................. H05B 6/06; H05B 6/12
[52] U.S. Cl. .................... 219/622; 219/625; 219/661; 219/663; 363/49
[58] Field of Search ................ 219/620, 622, 219/625, 626, 627, 661, 662, 663, 665, 721; 363/49

[56] References Cited

U.S. PATENT DOCUMENTS

| | | | |
|---|---|---|---|
| 4,013,859 | 3/1977 | Peters, Jr. ................ | 219/626 |
| 4,145,592 | 3/1979 | Mizukawa et al. ......... | 219/625 |
| 4,431,892 | 2/1984 | White ...................... | 219/10.49 |
| 4,446,350 | 5/1984 | Mizukawa et al. ......... | 219/10.77 |
| 4,453,068 | 6/1984 | Tucker et al. ............. | 219/10.77 |
| 4,456,807 | 6/1984 | Ogino et al. .............. | 219/10.77 |
| 4,511,781 | 4/1985 | Tucker et al. ............. | 219/10.77 |
| 4,564,733 | 1/1986 | Karklys .................... | 219/622 |
| 5,324,906 | 6/1994 | Dong ....................... | 219/626 |

*Primary Examiner*—Philip H. Leung
*Attorney, Agent, or Firm*—Brinks Hofer Gilson & Lione

[57] ABSTRACT

A delay timer incorporated into an induction cooking cartridge permits the use of the induction cooking cartridge with conventional modular cooktops including bi-metal power switches without damage to the induction circuitry.

16 Claims, 3 Drawing Sheets

INDUCTION COOKING CARTRIDGE FOR USE WITH BI-METAL SWITCHES

The present invention relates generally to cooktops and induction cooking, and, more particularly, to modular induction cooking cartridges for modular cooktops having conventional cooking controls.

BACKGROUND OF THE INVENTION

Modular cooktops have been manufactured for years and provide well known manufacturing and marketing advantages. For example, a modular cooktop chassis can be manufactured to accept a wide variety of modular cooktop cartridges, such as surface burner units and grilling elements. Using a single chassis design reduces inventory and manufacturing costs. From a marketing standpoint, future developments can be incorporated into modular cooking cartridge designs and retrofitted to the consumer's cooktop chassis. The consumer has the possibility of updating an older cooktop chassis with the latest technology without the expense of replacing the chassis.

One recent technological advance in cooktops includes induction cooking. Induction cooking can be explained by transformer theory. Essentially, an induction coil is located beneath the cooktop surface and is used to generate an oscillating magnetic field. When an iron-based cooking utensil, such as an iron pot or pan, is placed in the magnetic field, it acts like a shorted transformer secondary which is subject to a high induced electrical current at low voltage. Because of the high electrical currents that flow in the iron cookware, the cookware heats up and cooks its contents. It is, however, the heat from the cooking utensil that cooks the food, not the induction field, since the utensil generates the heat, it becomes, in effect, the burner.

Induction cooktops provide several advantages over conventional gas and electric cooktops that make them highly desirable to consumers. One advantage of induction cooking is the elimination of open flame and the reduction of residual hot spots on the cooktop. Conventional electric burners, on the other hand, can retain heat for prolonged periods. Induction cooktops also provide a smooth, unbroken cooking surface that is easier to clean. Thus, modular induction cooking cartridges are desirable as an upgrade to existing modular cooktops.

Bi-metal switch controls for cooking elements have proven to be inexpensive and reliable and have achieved widespread acceptance. They have been used for years as primary line switches for cooking elements in cooking appliances such as modular cooktops. A bi-metal switch includes a pair of contacts and a variable heater that causes one of the contacts to open and close. When the contact is closed, power is applied to the cooking element. When the contact is open, power is removed from the cooking element and allows the cooking element to cool. The amount of heat generated by the contact heater of the bi-metal switch, and thus the open and closed periods of the switch contacts is controlled by a user through cooking heat adjustment knobs. Controlling the rate at which the contact opens and closes and the amount of time that the contact is open and closed determines the amount of heat applied by the cooking element.

In operation, a user can select a higher 'temperature' setting, increasing the amount of time that the contacts remain closed. In essence, the user "turns up the heat". When the user selects a lower 'temperature' setting, he reduces the amount of time that the contacts are closed and "turns down the heat".

Unfortunately, the bi-metal switches conventionally used in ranges and modular cooktops are generally incompatible with induction circuitry. The bi-metal switch actuation creates line 'noise' which can cause induction inverter failure. This transient 'noise' is created for a period of time, called the 'settling time', as the contacts open and close and as current arcs across the contacts. Induction circuitry is very sensitive to the transients that occur during the settling time with possible resultant damage to the induction circuitry. Thus, conventional modular cooktops with bi-metal switches are unable to accommodate a modular induction cooking cartridge without replacement of the bi-metal switches with more expensive power switches. Replacing the bi-metal switches would increase the cost of modular cooktops for the accommodation of induction cooking cartridges or require different cooktops for different cooking cartridges.

SUMMARY OF THE INVENTION

The present invention provides a modular induction cooking cartridge that can be used with conventional modular cooktops. In the invention, a delay timer incorporated into an induction cooking cartridge permits the use of the induction cooking cartridge with conventional modular cooktops including bi-metal power switches without damage to the induction circuitry.

According to the invention, an induction cooking cartridge includes an inverter control circuit electrically connectable with a bi-metal switch of a conventional cooktop, an inverter circuit electrically connected to the inverter control circuit, and a delay timer disposed between the inverter control circuit and the inverter circuit. The delay timer includes a timer switch for preventing operation of the inverter circuit during the settling time of the bi-metal switch.

The invention further includes a method of using an induction cooking cartridge with a modular cooktop chassis having a bi-metal switch with a settling time by providing a modular induction cooking cartridge having an inverter circuit in the modular cooktop chassis, and introducing a time delay, upon each operation of the bi-metal switch delaying operation of the inverter circuit for at least the settling time of the bi-metal switch.

Additional features and advantages will become apparent to those skilled in the art upon consideration of the drawings and the following detailed description of a preferred embodiment exemplifying the best mode of carrying out the invention.

BRIEF DESCRIPTION OF THE DRAWINGS

The detailed description particularly refers to the accompanying figures in which.

DETAILED DESCRIPTION OF THE DRAWINGS

Figure 1:
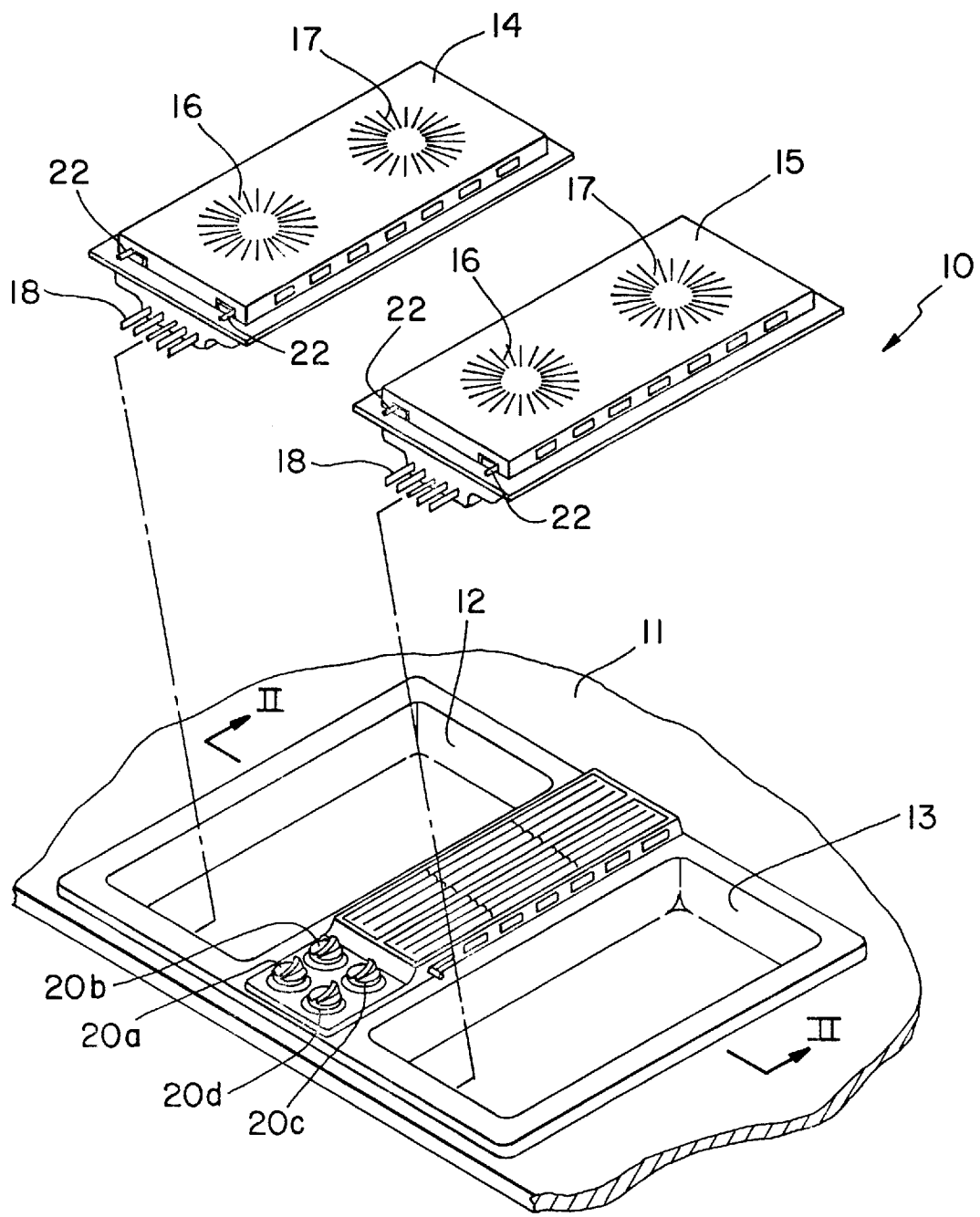
FIG. 1 is a partial exploded view of a modular range employing two induction cooktop cartridges.
Figure 2:
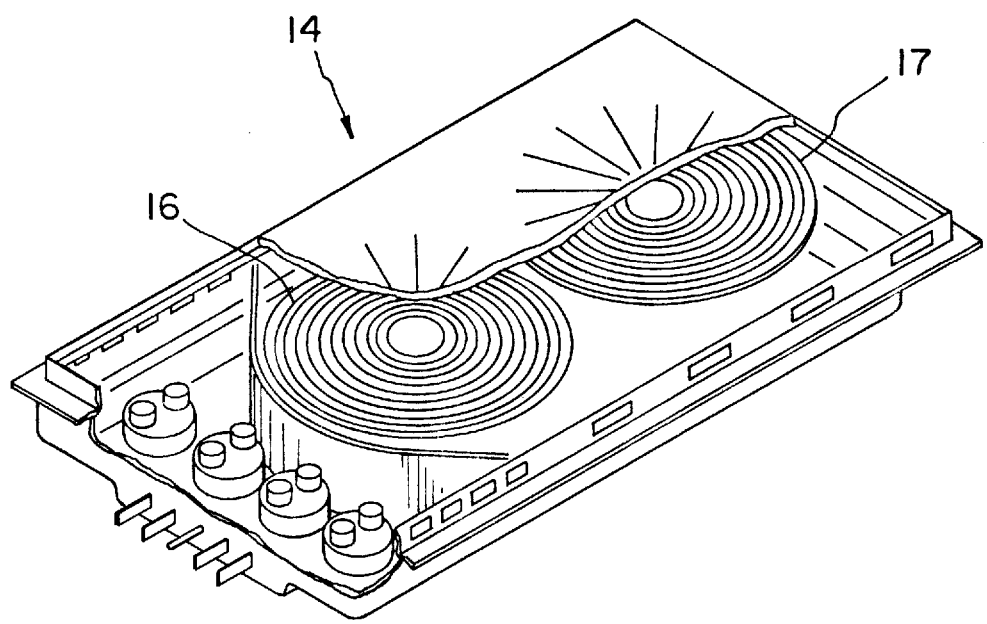
FIG. 2 is a partially cut away view of one of the induction cartridges of FIG. 1.

As illustrated in FIG. 1, a conventional modular cooktop 10 is mounted in a range or counter top 11 and includes a pair of grill pans 12, 13 for receiving modular cooking cartridges 14, 15. Each of the cooking cartridges 14, 15 is provided with a bayonet-type terminal 18 which is adapted to be removably received in an electrical receptacle 21 (FIG. 3) provided in the front wall of each grill pan 12, 13, but not shown in FIG. 1. Control of the modular cartridges 14, 15 is generally achieved by means of controls 20a–20d. Controls 20a–d of a conventional modular cooktop include bi-metallic temperature control switches, in which bi-metallic switching elements are operated to apply line power to the heating elements of a modular cooking cartridge for variable intervals (i.e., at variable on-off intervals) depending upon the position of the control, but, for induction cartridges 14, 15, the controls 20a–20d serve as on-off controls, with individual regulation of the induction units 16, 17 being achieved by means of infinitely variable slide resistors 22 which are in the circuits of the induction cooking cartridges 14, 15.

Figure 3:
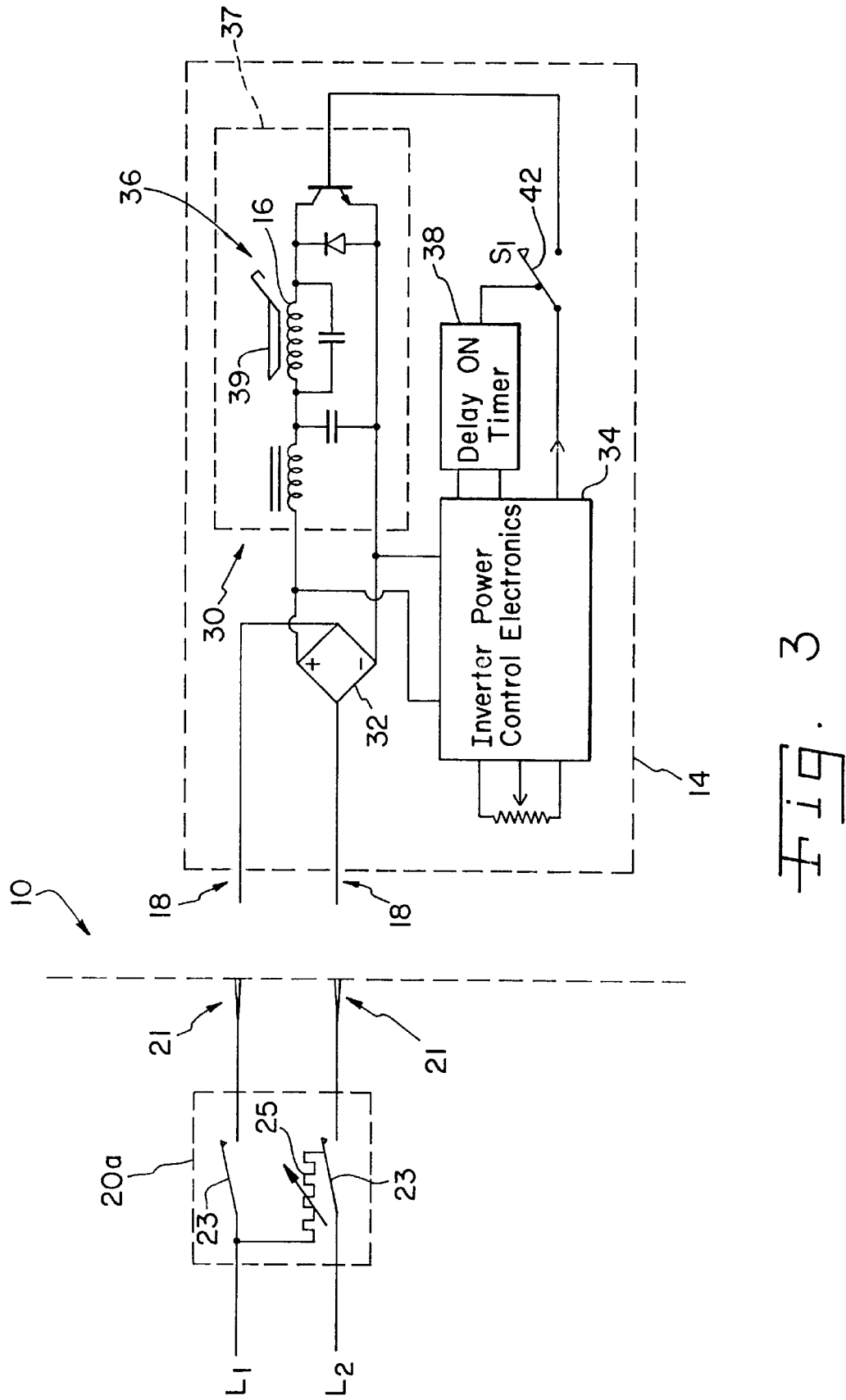
FIG. 3 is an electrical block diagram of the circuitry used with an induction cooktop.

A block diagram of the circuit of one of the induction coils 16 of the induction cooking cartridges is shown in FIG. 3. (The other circuit for the other induction coil 17 is omitted to avoid unnecessary duplication.) The conventional cooktop 10 includes a conventional bi-metal switch 20a, including contacts 23 and a variable heating element 25. The bi-metal switch 20a is electrically connected to a power line $L_1$, $L_2$ and is electrically connectable with the circuit carried in the induction cooking cartridges 14 (indicated by the broken line rectangle), through receptacle 21 and cartridge plug 18. The induction cooking circuit 30 includes a bridge rectifier 32, inverter power control electronics 34, invertor electronics 36 (shown in broken line 37), and a delay timer 38 electrically connected between the inverter power control electronics 34 and the invertor electronics 36. A cooking utensil 39 is illustrated positioned above an induction coil 16.

As is known in the art, the bi-metal switch 20a is characterized by a transient settling time, associated with the opening and closing of bi-metal switch contacts 23, during which arcing is possible. The inverter electronic circuit 36 is susceptible to damage caused by the transients and arcing during the settling time.

As shown in FIG. 3, 240 VAC is applied to the induction cooking circuit 30 from $L_1$ and $L_2$ by operation of contacts 23 of the bi-metal switch 20a. The bridge rectifier 32 is interconnected with $L_1$ and $L_2$ through the bi-metal switch contacts 23 and, when the contacts 23 of the bi-metal switch 20a are closed, generates a DC voltage to energize the inverter power control electronics 34. The output of the inverter power control electronics 34 is connected with the delay timer 38. The delay timer 38 is positioned to electrically isolate the inverter electronics 36 from the transients caused by the bi-metal switch contacts 23 during the settling time. Delay timer 38 operates a timer switch 42. Timer switch 42, when closed, passes the output of the inverter power control electronics 34 to the inverter electronics 36 to generate through induction coil 36, an electromagnetic field to heat the cooking utensil 39.

In preferred embodiments of the invention, the delay timer 38 introduces a predetermined delay time into the operation of the inverter circuit 36 which is longer than the settling time of the bi-metal switch 20a. As the bi-metal switch contacts 23 are closed, an operating voltage is applied to the inverter power control electronics 34 and to the delay timer 38. The delay timer 38 holds the timer switch 42 in the open position for the predetermined amount of time, generally longer than the time that noise is generated by the bi-metal switch 20a, effectively preventing the inverter electronics 36 from operating. During the time that the timer switch 42 is held open, the bi-metal switch contacts 23 fully close, the transients cease, and a stable DC voltage is applied to the inverter power control electronics 34. After the predetermined amount of time has elapsed, the delay timer 38 closes the timer switch 42 which then permits operation of the inverter electronics 36 by the inverter power control electronics 34. When the contacts 23 of the bi-metal switch 20a open, the delay timer 38 opens the timer switch 42 to isolate and protect the inverter electronics circuit 36 from any transient and arcing across the bi-metal switch contacts 23 as the contacts 23 open.

Although the invention has been described with reference to a certain preferred embodiment, variations and modifications can exist within the scope and spirit of the invention as set forth in the following claims.

I claim:

1. An induction cooking cartridge for a cooktop with a modular chassis having a bi-metal switch with a transient settling time, comprising:

an inverter power control circuit electrically connectable to the bi-metal switch;

an inverter circuit electrically connected to the inverter power control circuit; and a delay timer disposed between the inverter power control circuit and the inverter circuit for delaying operation of the inverter circuit during the settling time.

2. The cooktop of claim 1 wherein the delay timer includes a timer switch for preventing operation of the inverter circuit.

3. The cooktop of claim 2 wherein the timer switch is open for an amount of time at least as long as the settling time of the bi-metal switch.

4. In a modular cooktop having a chassis configured to receive at least one modular cooking cartridge and a bi-metal switch mounted on the chassis for providing power to the modular cooking cartridge, the improvement comprising:

a modular induction cooking cartridge including an induction cooking unit; and a delay timer for delaying operation of the induction cooking unit for an amount of time at least about as long as a settling time associated with the bi-metal switch.

5. The improvement of claim 4 wherein the delay timer includes a timer switch movable between an open position for preventing operation of the modular induction cooking cartridge and a closed position for permitting operation of the modular induction cooking cartridge.

6. The improvement of claim 5 wherein the delay timer further includes means for holding the timer switch in the open position for an amount of time at least about as long as the settling time.

7. In a modular cooktop including a chassis for receiving at least one modular induction cooking cartridge and a bi-metal switch attached to the chassis for providing power to the modular induction cooking cartridge, the improvement comprising:

an inverter power control circuit;

an inverter circuit; and a delay timer electrically connected to the inverter power control circuit and the inverter circuit for delaying operation of the inverter circuit at least as long as the settling time of the bi-metal switch.

8. The cartridge of claim 7 wherein the delay timer includes a timer switch having an open position and a closed position.

9. The cartridge of claim 8 wherein the delay timer includes means for holding the timer switch in the open position for at least as long as the settling time.

10. A method of using an induction cooktop with a modular cooktop chassis having a bi-metal switch with a settling time, comprising the steps of:

provid ing an induction cooking cartridge having an inverter cooking circuit in said cooktop; and introducing a time delay in the operation of the inverter cooking circuit upon operation of the bi-metal switch.

11. The method of claim 10 wherein the time delay is about as long as the settling time of the bi-metal switch.

12. The method of claim 10 wherein the time delay is longer than the settling time of the bi-metal switch.

13. The method of claim 10 wherein the time delay is introduced by a delay timer.

14. The method of claim 10 wherein the time delay is introduced by a timer switch.

15. The method of claim 14 wherein the timer switch blocks the operation of the inverter cooking unit for the period of the time delay.

16. The method of claim 15 wherein the timer switch includes contacts that are open to introduce the period of the time delay.

* * * * *